United States Patent
Kang (10) Patent No.: US 6,879,360 B2
(45) Date of Patent: Apr. 12, 2005

(54) REFLECTIVE LIQUID CRYSTAL DISPLAY DEVICE AND FABRICATING METHOD THEREOF

(75) Inventor: Won-Seok Kang, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/455,408

(22) Filed: Jun. 6, 2003

(65) Prior Publication Data
US 2004/0119901 A1 Jun. 24, 2004

(30) Foreign Application Priority Data
Dec. 20, 2002  (KR) ............................... 10-2002-0081962

(51) Int. Cl.[7] ............................................ G02F 1/1335
(52) U.S. Cl. ...................................... 349/113; 349/110
(58) Field of Search ................................ 349/113, 139, 349/114, 110, 43, 138

(56) References Cited

U.S. PATENT DOCUMENTS

| 5,408,345 | A | | 4/1995 | Mitsui et al. |
|---|---|---|---|---|
| 5,500,750 | A | | 3/1996 | Kanbe et al. |
| 6,008,875 | A | * | 12/1999 | Ikeno et al. ................. 349/139 |
| 6,266,111 | B1 | * | 7/2001 | Kataoka et al. ............. 349/113 |
| 6,341,002 | B1 | | 1/2002 | Shimizu et al. |
| 6,459,463 | B2 | | 10/2002 | Kim et al. |
| 6,747,718 | B2 | * | 6/2004 | Kanou et al. ................ 349/113 |

* cited by examiner

Primary Examiner—Kenneth Parker
Assistant Examiner—David Chung
(74) Attorney, Agent, or Firm—Morgan Lewis & Bockius LLP (57) ABSTRACT

A reflective liquid crystal display device and a fabricating method thereof are disclosed in the present invention. The liquid crystal display device includes first and second substrates spaced apart from each other, a gate line and a data line over an inner surface of the first substrate, the gate line and the data line crossing each other and defining a sub-pixel region, a thin film transistor connected to the gate line and the data line, a first passivation layer on the thin film transistor layer, the first passivation layer having a plurality of first uneven patterns in the sub-pixel region, a second passivation layer acting as a light-shielding layer on the first passivation layer, the second passivation layer having a plurality of second uneven patterns on the first uneven patterns, and a reflective layer on the second passivation layer, the reflective electrode having a plurality of third uneven patterns on the second uneven patterns.

20 Claims, 13 Drawing Sheets

*FIG. 1A*

Related Art

FIG. 1B

*Related Art*

FIG. 2A

Related Art

FIG. 2B

Related Art

FIG. 3

Related Art

FIG. 4A

Related Art

FIG. 4B

Related Art

FIG. 5A

*Related Art*

FIG. 5B

*Related Art*

*FIG. 5C*

*Related Art*

REFLECTIVE LIQUID CRYSTAL DISPLAY DEVICE AND FABRICATING METHOD THEREOF

This application claims the benefit of the Korean Application No. P2002-081962 filed on Dec. 20, 2002, which is hereby incorporated by reference.

BACKGROUND OF THE INVENTION

1. Field of the Invention

The present invention relates to a liquid crystal display device, and more particularly, to a reflective liquid crystal display device and a fabricating method thereof. Although the present invention is suitable for a wide scope of applications, it is particularly suitable for improving a contrast ratio and an aperture ratio of the reflective liquid crystal display device.

2. Discussion of the Related Art

Flat panel display (FPD) devices processing and displaying a mass of information have been a subject of recent researches in the coming of the information age. Among the FPD devices, liquid crystal display (LCD) devices are developed as next generation display devices because they are portable and have a low power consumption. Presently, among the various types of LCD devices commonly used, active matrix LCD (AM-LCD) devices in which switching elements such as thin film transistors (TFTs) are disposed in a matrix for each pixel region have been developed because of their high resolution and superiority in displaying moving images.

In general, LCD devices are classified into transmissive LCD devices using a backlight unit and reflective LCD devices using an external light source. The transmissive LCD devices use a backlight unit, which consumes more than two thirds of the total power. On the other hand, since the reflective LCD devices use an external light source instead of a backlight unit, the power consumption is reduced. Accordingly, the reflective LCD devices are researched and developed due to their advantages over the transmissive LCD devices.

Figure 1A:
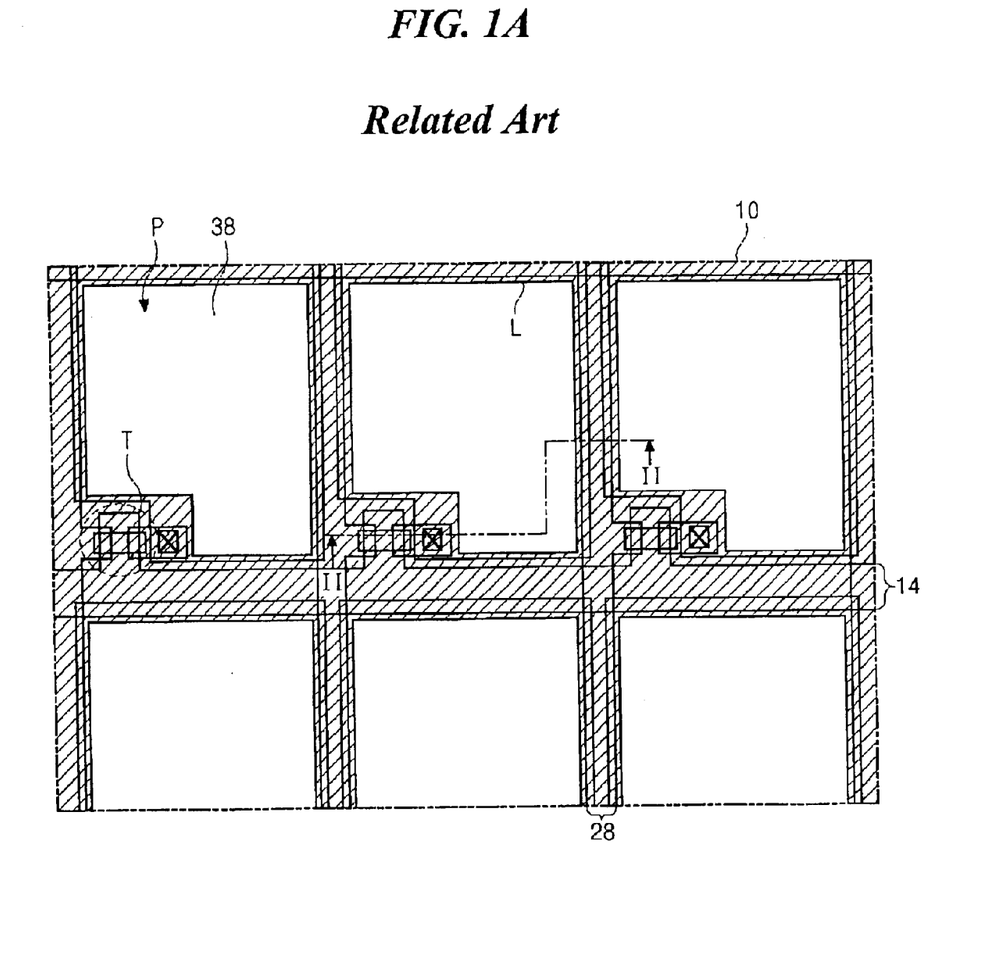
FIGS. 1A and 1B are schematic plane views showing an array substrate and a color filter substrate according to the related art, respectively.
Figure 1B:
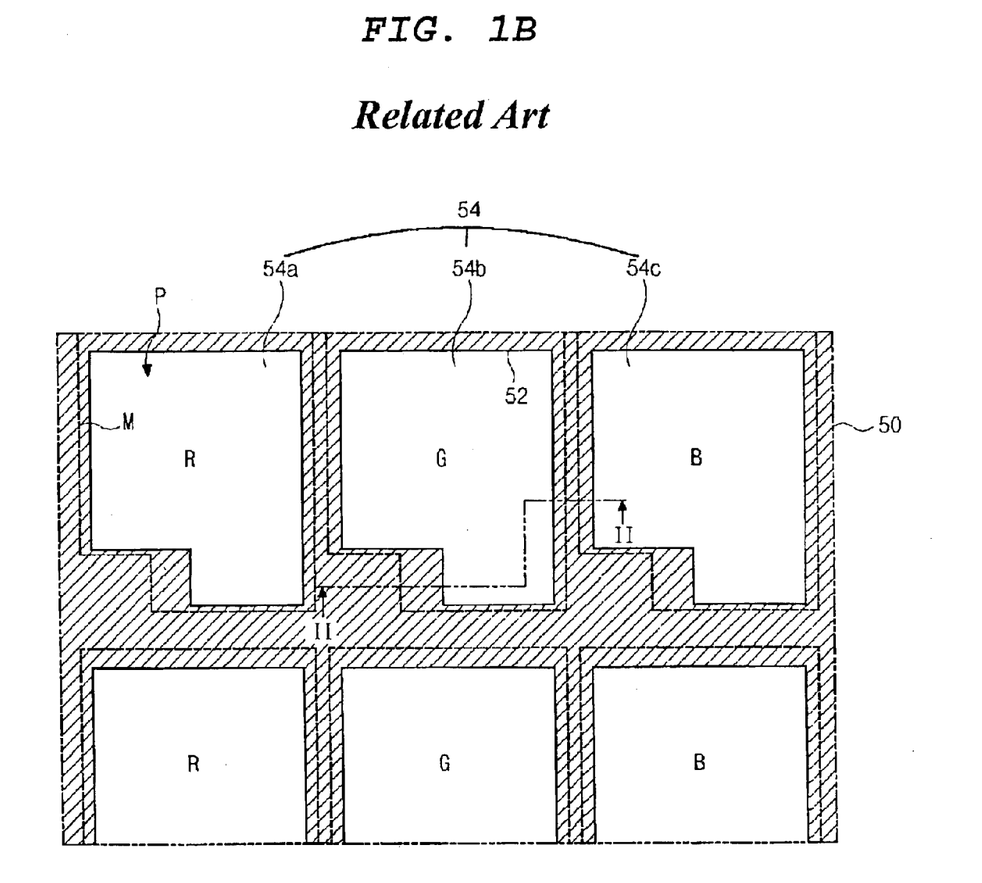

FIGS. 1A and 1B are schematic plane views showing an array substrate and a color filter substrate according to the related art, respectively.

In FIG. 1A, a gate line 14 and a data line 28 crossing each other are disposed on a first substrate 10. A thin film transistor (TFT) "T" is disposed at each intersection of the gate line 14 and the data line 28. A sub-pixel region "P" is defined by the gate line 14 and the data line 28 and a reflective electrode 38 connected to the TFT "T" is formed in the sub-pixel region "P". The reflective electrode 38 overlaps the adjacent gate line 14 and the adjacent data line 28 to increase brightness. The reflective electrode 38 is formed of an opaque material having a high reflectance to reflect the incident light from the exterior. The reflective electrode 38 is a pixel electrode functioning as a reflecting plate. A region "L" of slant lines corresponds to a black matrix (not shown) of a second substrate (not shown).

In FIG. 1B, a second substrate 50 also has the sub-pixel region "P". A black matrix 52 is formed at a border region between the adjacent sub-pixel regions "P". Red, green, and blue color filters 54a, 54b, and 54c are sequentially disposed in each sub-pixel region "P". The red, green, and blue color filters 54a, 54b, and 54c constitute a color filter layer 54 and a common electrode (not shown) is formed on the color filter layer 54. A region "M" surrounded by dotted lines corresponds to the reflective electrode 38 (shown in FIG. 1A).

Figure 2A:
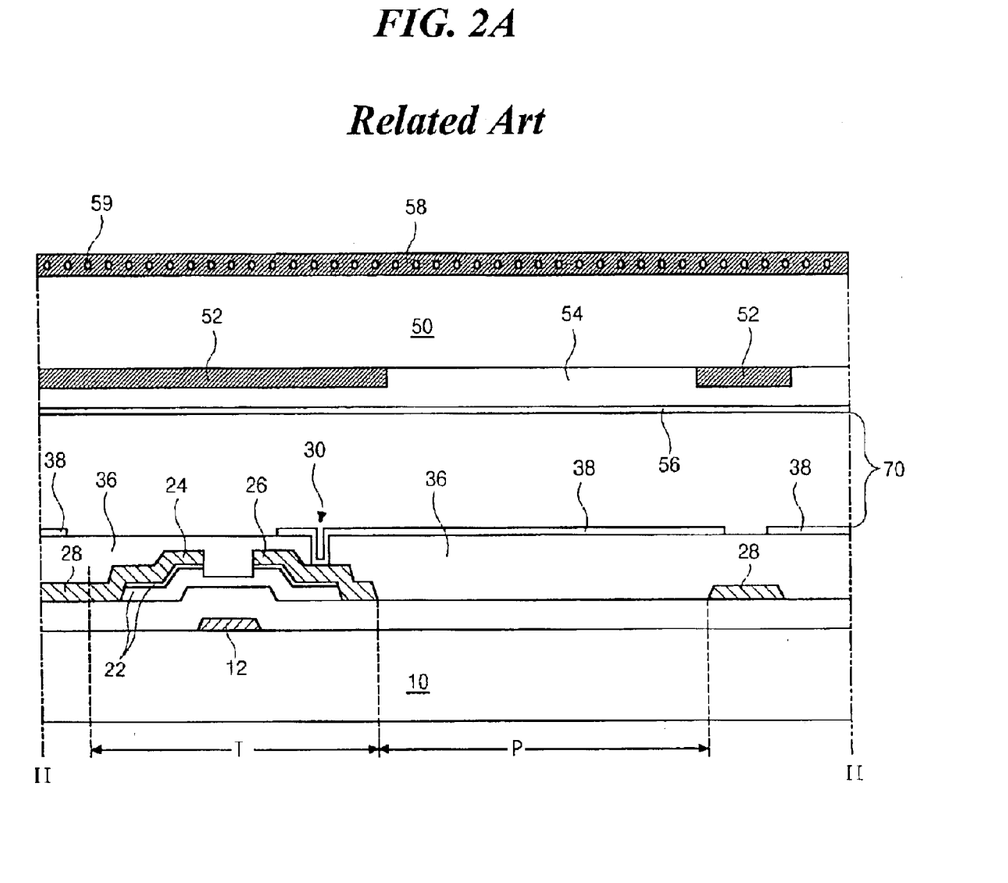
FIG. 2A is a schematic cross-sectional view of a reflective liquid crystal display device having a mirror type reflective electrode and a front scattering film according to the related art.
Figure 2B:
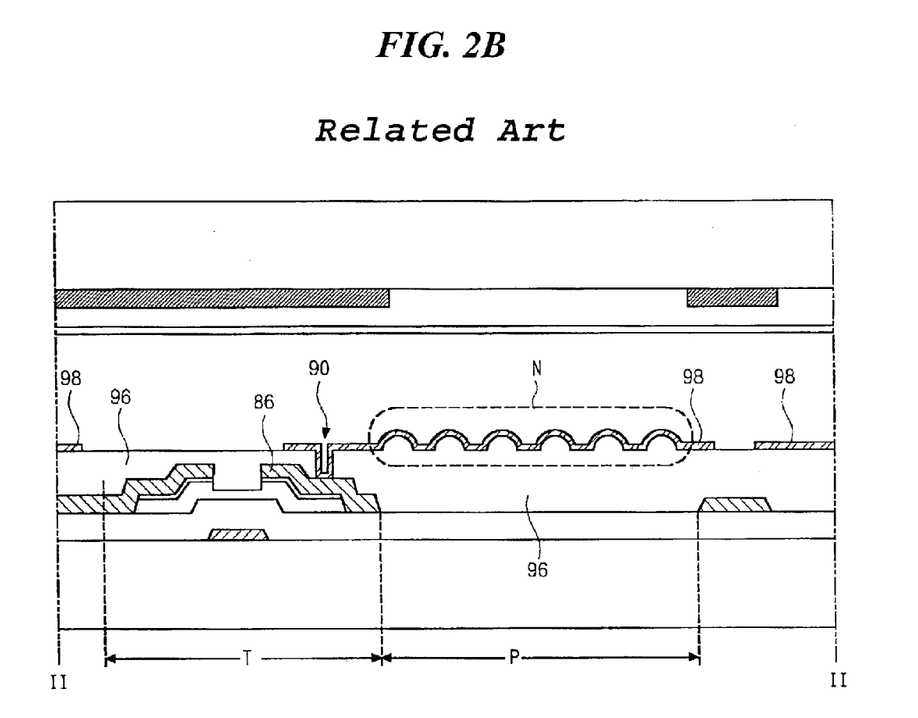
FIG. 2B is a schematic cross-sectional view of a reflective liquid crystal display device having an uneven surface type reflective electrode according to the related art.

FIG. 2A is a schematic cross-sectional view of a reflective liquid crystal display device having a mirror type reflective electrode and a front scattering film according to the related art, and FIG. 2B is a schematic cross-sectional view of a reflective liquid crystal display device having an uneven surface type reflective electrode according to the related art. FIGS. 2A and 2B are taken along line II—II of FIGS. 1A and 1B, respectively.

In FIG. 2A, first and second substrates 10 and 50 face into and are spaced apart from each other. A thin film transistor (TFT) "T" including a gate electrode 12, a semiconductor layer 22, and source and drain electrodes 24 and 26 is formed on the inner surface of the first substrate 10. A passivation layer 36 including a drain contact hole 30 is formed on the TFT "T" and the drain contact hole exposes the drain electrode 26. A reflective electrode 38 connected to the drain electrode 26 through the drain contact hole 30 is formed on the passivation layer 36 in a sub-pixel region "P". A data line 28 is connected to the source electrode 24. To show an overlapping structure of the reflective electrode 38 and the data line 28, a data line of the adjacent sub-pixel region is also illustrated. The passivation layer 36 is formed to be thick using an insulating material having a low dielectric constant to reduce an electrical interference between the data line 28 and the reflective electrode 38. The reflective electrode 38 is formed of an opaque metallic material having a high reflectance. Since the reflective electrode 38 has a flat surface, the light is reflected as if the reflective electrode 38 is a mirror. This phenomenon is referred to as a mirror reflection.

A black matrix 52 is formed on the inner surface of the second substrate 50 in a region corresponding to the TFT "T" and the data line 28. A color filter layer 54 is formed on the black matrix 52, and a common electrode 56 is formed on the color filter layer 54. A liquid crystal layer 70 is interposed between the reflective electrode 38 and the common electrode 56. A front scattering film 58 including a plurality of scattering particles 59 is formed on the outer surface of the second substrate 50. The front scattering film 58 scatters the light reflected from the reflective electrode 38 to increase a reflection efficiency. An LCD device having a front scattering film provides a reflection efficiency higher than an LCD device having a mirror type reflective electrode. However, the LCD device having a front scattering film has some disadvantages in that a material for the front scattering film is expensive and it is difficult to adjust reflectance. To resolve these problems, an LCD device including a reflective electrode of an uneven shape without a front scattering film has been suggested.

In FIG. 2B, descriptions for portions having the same structures as the LCD device of FIG. 2A will be omitted for simplicity. A passivation layer 96 having a drain contact hole 90 and a first uneven pattern in a sub-pixel region "P" is formed on a TFT "T". The drain contact hole exposes a drain electrode 86. A reflective electrode 98 connected to the drain electrode 86 through the drain contact hole 90 is formed on the passivation layer 96. The reflective electrode 98 includes a second uneven pattern corresponding to the first uneven pattern. Since the reflective electrode 98 is formed by depositing a metallic material on the passivation layer 96, the second uneven pattern is formed on the first uneven pattern. A region "N" indicates the second uneven pattern formed by using the first uneven pattern as a seed. As compared to an LCD device including a front scattering film, a material cost is reduced due to the omission of a front scattering film, and a process efficiency is improved due to an adjustment of reflectance by controlling the structure of an uneven pattern in an LCD device having an uneven surface type reflective electrode.

Figure 3:
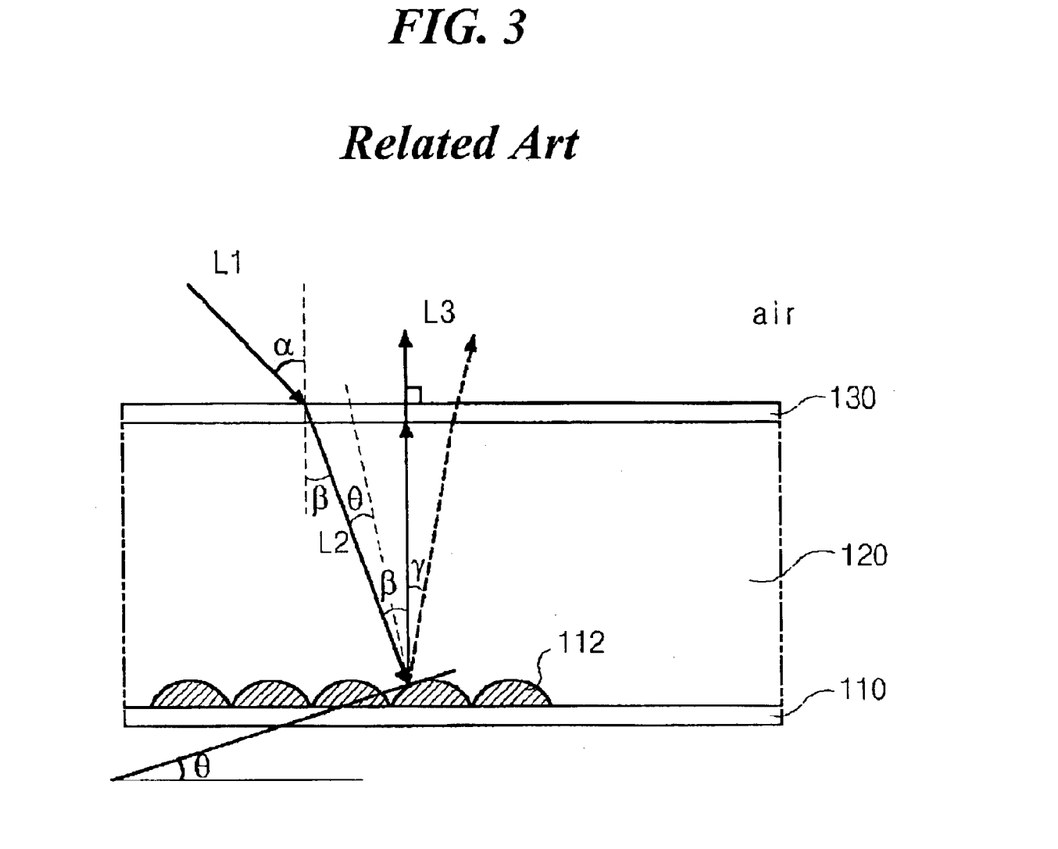
FIG. 3 is a schematic cross-sectional view showing a path of an incident light in a liquid crystal display device having an uneven surface type reflective electrode according to the related art.

FIG. 3 is a schematic cross-sectional view showing a path of an incident light in a liquid crystal display device having an uneven surface type reflective electrode according to the related art.

In FIG. 3, first and second substrates 110 and 130 face into and are spaced apart from each other. A liquid crystal layer 120 is interposed between the first and second substrates 110 and 130. An incident light "L1" from the air passes through the second substrate 130 and the liquid crystal layer 120, and is reflected at a reflective electrode 112 having an uneven pattern. Then, the reflected light is emitted through the second substrate 130 and is perceived by users. For example, when the incident light "L1" has an incident angle α (alpha) of about 30° with respect to the normal direction of the second substrate 130, a refracted light "L2" has a refraction angle β (beta) of about 20° with respect to the normal line according to Snell's Law. The refracted light "L2" passes through a liquid crystal layer 120 and is reflected by the reflective electrode 112. A slanting angle θ (theta) due to the uneven pattern of the reflective electrode 112 may be within the range of about 6° to 10° so that reflected light "L3" can be transmitted within a main viewing angle γ (gamma). The slanting angle θ (theta) due to the uneven pattern can be adjusted during a fabricating process of the reflective electrode 112 having the uneven pattern.

Figure 4A:
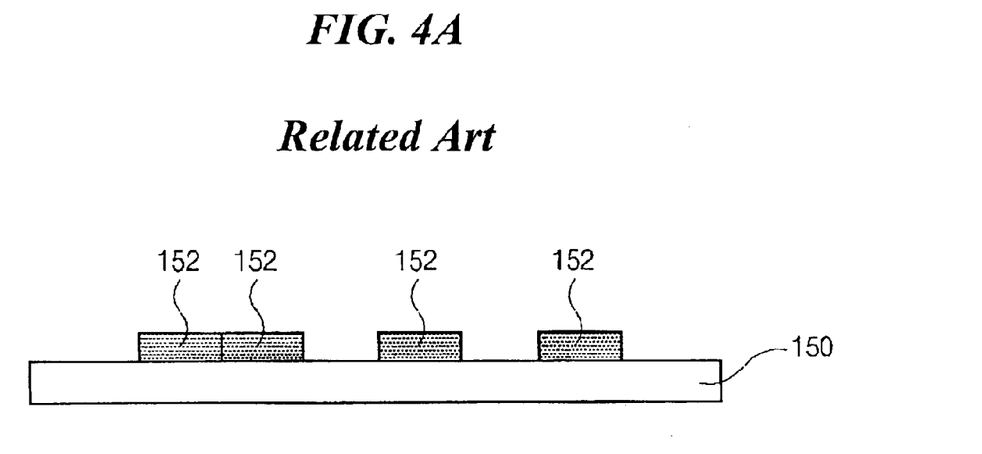
FIGS. 4A and 4B are schematic cross-sectional views showing the fabricating process of an uneven pattern having a single layer structure according to the related art.
Figure 4B:
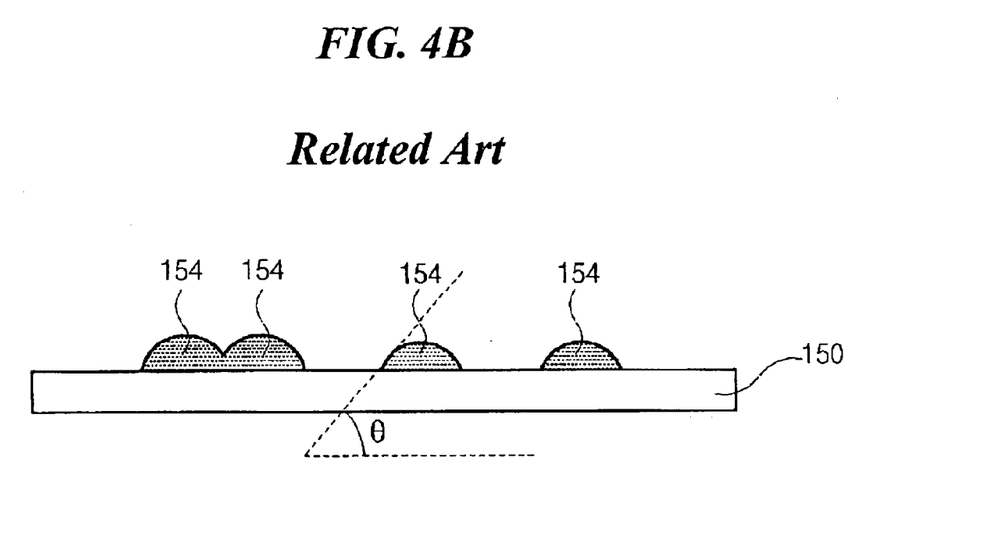

FIGS. 4A and 4B are schematic cross-sectional views showing the fabricating process of an uneven pattern having a single layer structure according to the related art.

In FIG. 4A, organic material patterns 152 are formed on a substrate 150 by depositing and patterning an organic material. The organic material patterns are overlapped or spaced apart from each other. The organic material is formed of a positive type photosensitive material and its irradiated portion is eliminated by development. The organic material patterns 152 have a rectangular shape due to characteristics of the photolithographic process.

In FIG. 4B, the organic material patterns 152 (shown in FIG. 4A) are melted and cured by a heat-treatment to become uneven patterns 153 having an effective slanting angle θ (theta). A straight sidewall of each organic material pattern 152 (shown in FIG. 4A) becomes round by using the spread of materials during the melting process and the melted uneven patterns 154 become hard during the curing process. The effective slanting angle θ (theta) can be controlled through the adjustment of a distance between the organic material patterns 152 (shown in FIG. 4A) and the area of an overlapped portion. However, the fabricating process of the uneven patterns 154 becomes complicated and provides a low reproducibility.

Figure 5A:
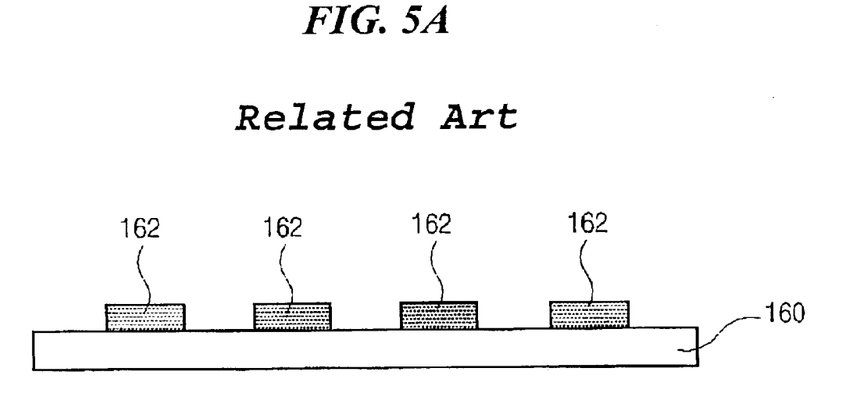
FIGS. 5A to 5C are schematic cross-sectional views showing the fabricating process of an uneven pattern having a double layer structure according to the related art.
Figure 5B:
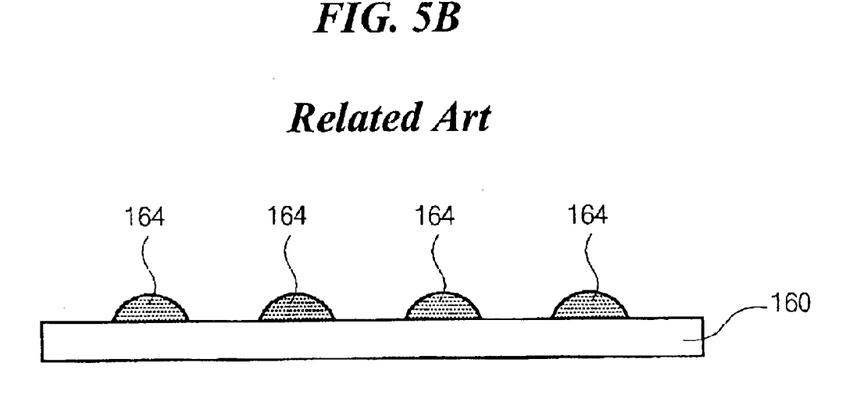
Figure 5C:
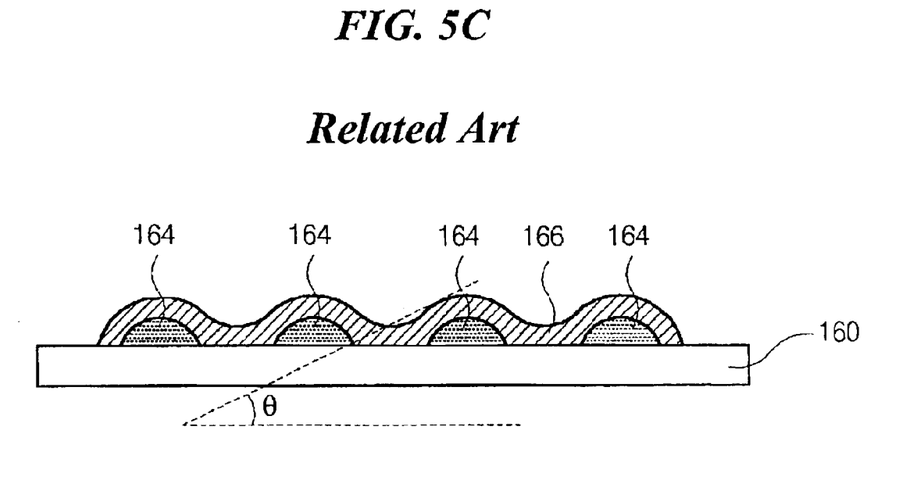

FIGS. 5A to 5C are schematic cross-sectional views showing the fabricating process of an uneven pattern having a double layer structure according to the related art.

In FIG. 5A, organic material patterns 162 spaced apart from each other are formed on a substrate 160. The organic material patterns 162 have a rectangular shape through the same photolithographic process as that of the organic material patterns 152 of FIG. 4A.

In FIG. 5B, the organic material patterns 162 (shown in FIG. 5A) are melted and cured by a heat-treatment to become uneven patterns 164. The uneven patterns 164 are used as seeds for the subsequent uneven shape.

In FIG. 5C, an organic material layer 166 having an uneven shape is formed on the uneven patterns 164 by coating an organic material. An effective slanting angle θ (theta) can be adjusted by a space between the adjacent uneven patterns 164. Since each uneven pattern 164 has an equal shape, a density of the uneven patterns 164 can be controlled by the adjustment of the space along the main viewing angle. Thus, the uneven surface of the organic material layer 164 can be obtained by using an acrylic organic material through two step processes to increase the reflectance along the main viewing angle. In the first step process, seeds of an uneven shape are randomly formed. In the second step process, a resulting uneven pattern is obtained by forming an organic material layer on the seeds with various thicknesses.

Generally, the organic material layer 166 on the uneven patterns 164 is formed of a transparent organic material. In the reflective LCD device according to the related art, metal lines such as a gate line and a data line are exposed between the reflective electrodes. Since a voltage (i.e., data signal) is not applied to a liquid crystal layer over the metal lines, the reflected light from the metal lines degrades a contrast ratio of the reflective LCD device. To solve this problem, a black matrix is formed on the facing substrate. However, an aperture ratio is reduced due to the increase of a black matrix area. Moreover, since the black matrix is formed on the facing substrate, a contrast ratio is reduced when a misalignment occurs during an attaching process.

SUMMARY OF THE INVENTION

Accordingly, the present invention is directed to a reflective liquid crystal display device and a fabricating method thereof that substantially obviate one or more of problems due to limitations and disadvantages of the related art.

Another object of the present invention is to provide a reflective liquid crystal display device and a fabricating method thereof that improve a contrast ratio and an aperture ratio.

Another object of the present invention is to provide a reflective liquid crystal display device where a black matrix is formed on a first substrate including a reflective electrode and an additional black matrix on a second substrate is omitted.

A further object of the present invention is to provide a reflective liquid crystal display device where a first passivation layer on a second passivation layer having unevenness is formed of an opaque material and light reflected from metal lines is prevented without reducing an aperture ratio.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates spaced apart from each other, a gate line and a data line over an inner surface of the first substrate, the gate line and the data line crossing each other and defining a sub-pixel region, a thin film transistor connected to the gate line and the data line, a first passivation layer on the thin film transistor layer, the first passivation layer having a plurality of first uneven patterns in the sub-pixel region, a second passivation layer acting as a light-shielding layer on the first passivation layer, the second passivation layer having a plurality of second uneven patterns on the first uneven patterns, and a reflective layer on the second passivation layer, the reflective electrode having a plurality of third uneven patterns on the second uneven patterns.

In another aspect of the present invention, a method of fabricating a liquid crystal display device includes forming a gate line and a data line crossing each other over a first substrate, the gate line and the data line defining a sub-pixel region, forming a thin film transistor connected to the gate line and the data line, forming an organic material layer on the thin film transistor layer, forming a first passivation layer having a plurality of first uneven patterns in the sub-pixel region, forming a second passivation layer acting as a light-shielding layer on the first passivation layer, wherein the second passivation layer has a plurality of second uneven patterns on the first uneven patterns of the first passivation layer, forming a reflective layer on the second passivation layer, wherein the reflective electrode has a plurality of third uneven patterns on the second uneven patterns of the second passivation layer, forming a common electrode on a second substrate, attaching the first and second substrates to each other such that the reflective layer faces into the common electrode, and forming a liquid crystal layer between the reflective electrode and the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

A liquid crystal display device according to the present invention includes first and second substrates facing into each other, and a liquid crystal layer interposed therebetween. A sub-pixel region is defined in the first and second substrates as a minimum unit for displaying images. A gate line and a data line crossing each other are formed over the inner surface of the first substrate. A thin film transistor including a gate electrode, a semiconductor layer, and source and drain electrodes is connected to the gate line and the data line in each sub-pixel region and a first passivation layer covers the thin film transistor. The first passivation layer has a plurality of uneven patterns in the sub-pixel region. The plurality of uneven patterns are randomly disposed, and a space between the adjacent uneven patterns exposes a gate insulating layer.

A second passivation layer formed on the first passivation layer is formed of a material having an optical density greater than 3, such as black resin. The second passivation layer improves a reproducibility of a slanting angle of the uneven pattern in the first passivation layer and functions as a black matrix because the second passivation layer is formed of a light-shielding material, such as black resin screening light. The first and second passivation layers have a drain contact hole exposing the drain electrode. A reflective electrode connected to the drain electrode through the drain contact hole can be formed on the second passivation layer. Otherwise, an electrically floating reflective plate can be formed on the second passivation layer in the sub-pixel region and an interlayer insulating layer having a drain contact hole through the first and second passivation layer can be formed on the reflective plate. In the latter structure, a pixel electrode of a transparent conductive material connected to the drain electrode through the drain contact hole can be formed on the interlayer insulating layer.

Since the second passivation layer of a light-shielding material is formed over the first substrate, an additional black matrix on the second substrate can be omitted and an aperture ratio is improved. Moreover, since the reflected light from the metal lines is effectively shielded by the second passivation layer, the reduction of a contrast ratio is prevented. Finally, since the light-shielding pattern (i.e., the second passivation layer) is formed on the substrate having the metal lines, a light leakage resulting from a misalignment is effectively prevented.

Figure 6A:
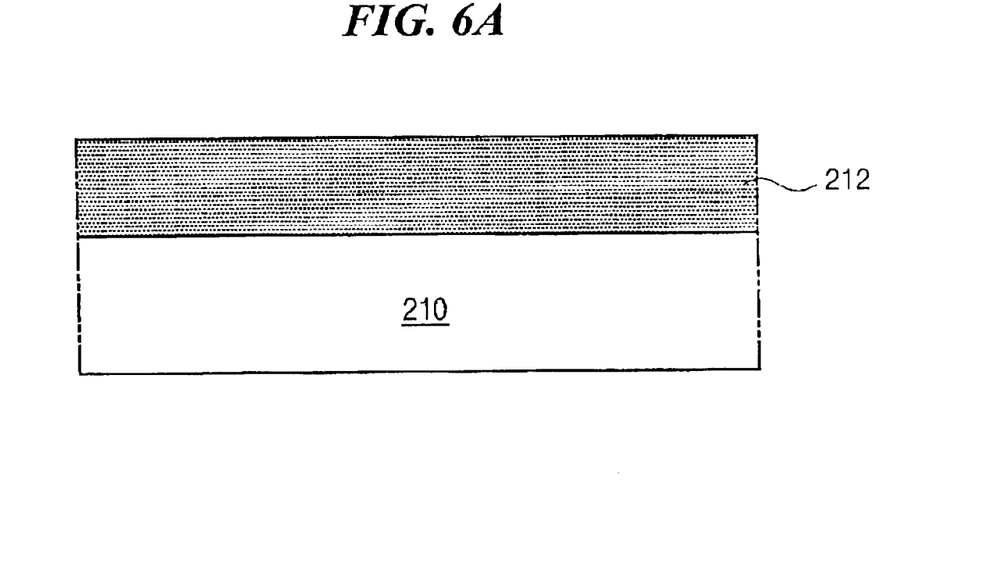
FIGS. 6A to 6C are schematic cross-sectional views showing the fabricating process of an uneven pattern according to a first embodiment of the present invention.
Figure 6B:
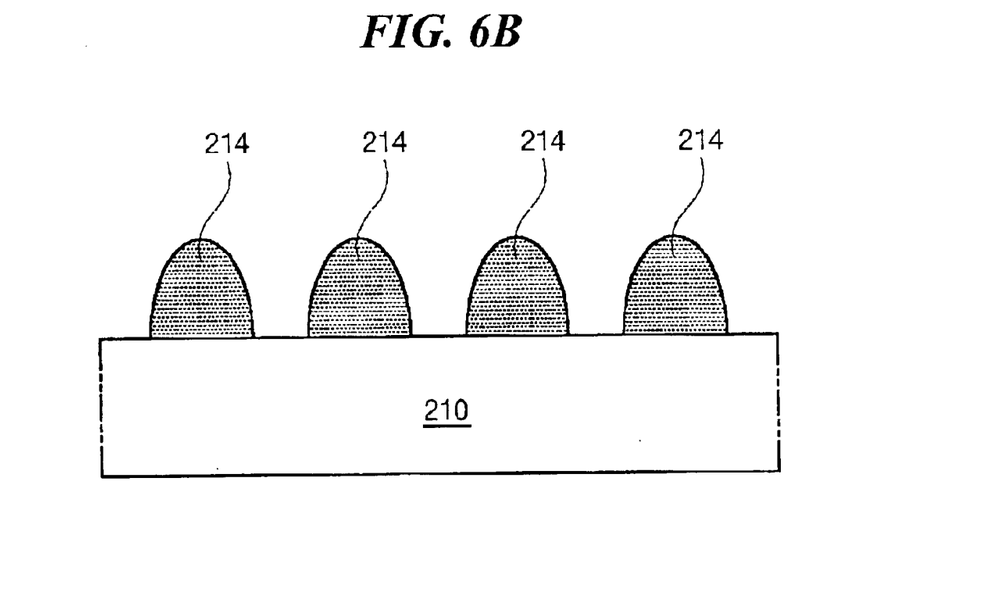
Figure 6C:
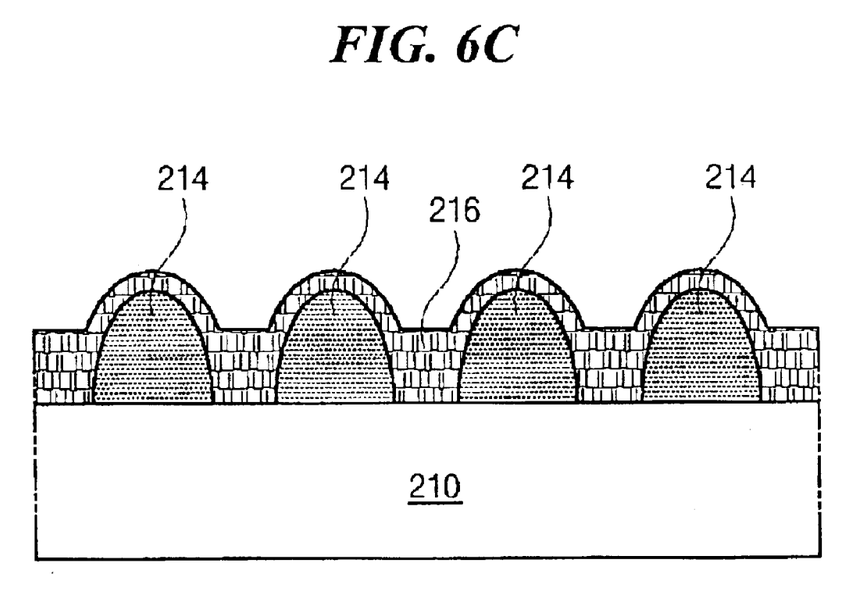

FIGS. 6A to 6C are schematic cross-sectional views showing the fabricating process of an uneven pattern according to a first embodiment of the present invention.

In FIG. 6A, a first organic material layer 212 is formed on a substrate 210 by coating a first organic material. The first organic material is a photosensitive organic material. For example, a positive type photosensitive organic material that is eliminated when the light is irradiated can be used as the first organic material.

In FIG. 6B, a first uneven pattern 214 is formed through photolithographic, melting and curing processes of the first organic material layer 212 (shown in FIG. 6A). The photolithographic process includes exposure and development. The first uneven pattern 214 has a round top portion.

In FIG. 6C, a second organic material layer 216 is formed on the first uneven pattern 214 by coating a second organic material. A thickness of the second organic material layer 216 is determined such that the second organic material layer 216 has a second uneven pattern along the first uneven pattern 214. That is, the second organic material is coated with a thickness such that the reproducibility of a slanting angle of the first uneven pattern 214 increases. The second organic material is a light-shielding material (i.e., an opaque material). For example, a black resin is used as the second organic material.

Figure 7:
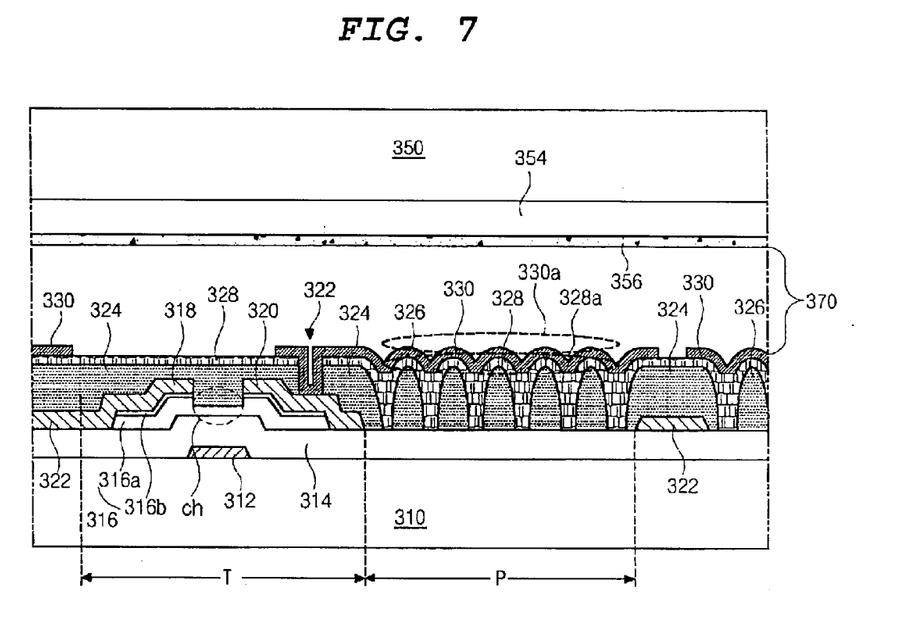
FIG. 7 is a schematic cross-sectional view showing a reflective liquid crystal display device according to the first embodiment of the present invention.

FIG. 7 is a schematic cross-sectional view showing a reflective liquid crystal display device according to the first embodiment of the present invention.

In FIG. 7, first and second substrates 310 and 350 face into each other and have a sub-pixel region "P". A liquid crystal layer 370 is interposed between the first and second substrates 310 and 350. A gate electrode 312 is formed on the inner surface of the first substrate 310, and a gate insulating layer 314 is formed on the gate electrode 312. A semiconductor layer 316 including an active layer 316a and an ohmic contact layer 316b is formed on the gate insulating layer 314 over the gate electrode 312. Source and drain electrodes 318 and 320 spaced apart from each other are formed on the semiconductor layer 316. A data line 322 is connected to the source electrode 318, and a gate line (not shown) is connected to the gate electrode 312. The gate electrode 312, the semiconductor layer 316, and source and drain electrodes 318 and 320 constitute a thin film transistor (TFT) "T". The active layer 316a exposed between the source and drain electrodes 318 and 320 is defined as a channel region "ch" where carriers such as electrons or holes move.

A first passivation layer 324 is formed on the source and drain electrodes 318 and 320. The first passivation layer 324 includes a plurality of first uneven patterns 326 in the sub-pixel region "P". The plurality of the first uneven patterns 326 are randomly disposed on the gate insulating layer 314. The first passivation layer 324 covers the TFT "T" to protect the channel region "ch" of the active layer 316a and the data line 322 to prevent a parasitic capacitance between the data line 322 and a subsequent reflective electrode 330. A second passivation layer 328 of a light-shielding material is formed on the first passivation layer 324. The second passivation layer 328 has a plurality of second uneven patterns 328a on the plurality of the first uneven patterns 326. The second passivation layer 328 has a thickness such that the plurality of the second uneven patterns 328a reproduce the plurality of the first uneven patterns 326. The second passivation layer 328 has a drain contact hole 322 exposing a portion of the drain electrode 320 through the first passivation layer 324. The first and second passivation layers 324 and 328 are formed of an organic material having a low dielectric constant. Especially, the first passivation layer 324 is formed of a photosensitive organic material and the second passivation layer 328 is formed of a light-shielding material having an optical density greater than 3. For example, a black resin is used for the second passivation layer 328.

A reflective layer 330 connected to the drain electrode 320 through the drain contact hole 322 is formed on the second passivation layer 328. The reflective layer 330 has a plurality of third uneven patterns 330a on the plurality of the second uneven patterns 328a. The plurality of the first uneven patterns 326 and the plurality of the second uneven patterns 328a function as a seed for the plurality of the third uneven patterns 330a. Since the reflective layer 330 overlaps the data line 322 to improve the brightness and the aperture ratio, the first and second passivation layers 324 and 328 are formed of an organic material having a low dielectric constant to prevent a parasitic capacitance between the reflective layer 330 and the data line 322. A color filter layer 354 and a common electrode 356 are sequentially formed on the inner surface of the second substrate 350.

Since the second passivation layer increasing the reproducibility of a slanting angle is formed of the light-shielding material, the second passivation layer 328 functions as a black matrix. Accordingly, the reflection at the metal lines, such as a gate line and a data line, and the irradiation onto the TFT are effectively prevented. Therefore, an additional black matrix on the second substrate is not necessary and a high aperture ratio is obtained. Moreover, since the second passivation layer is formed on the first substrate having the metal layer, the reduction of a contrast ratio due to a misalignment is also prevented.

Alternatively, the reflective layer may be electrically floated and an interlayer insulating layer may be formed on the reflective layer. Moreover, a transparent pixel electrode on the interlayer insulating layer may be connected to the drain electrode through the drain contact hole in the first and second passivation layer and the interlayer insulating layer.

Figure 8:
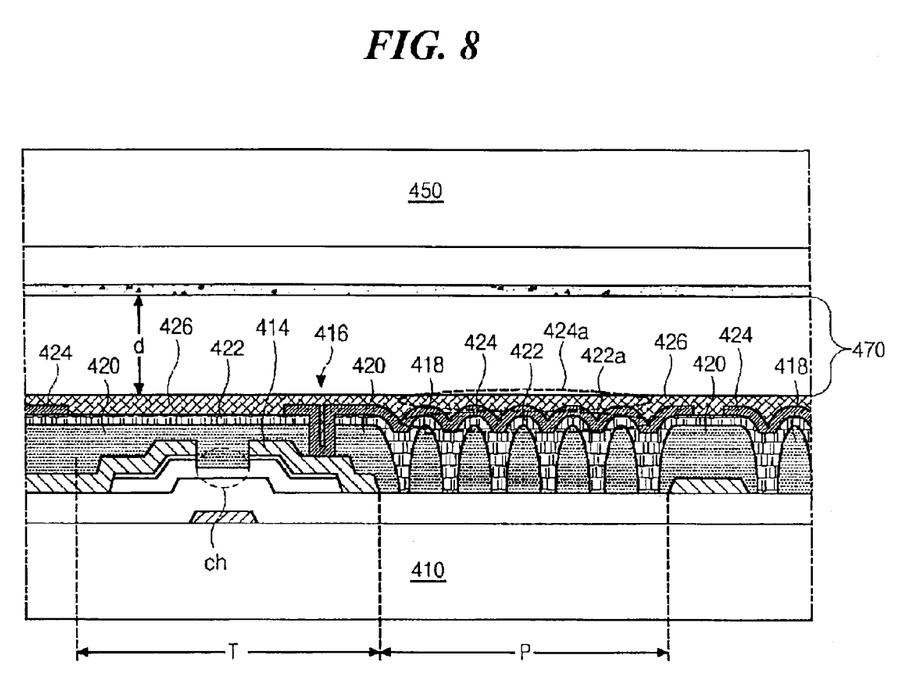
FIG. 8 is a schematic cross-sectional view showing a reflective liquid crystal display device according to a second embodiment of the present invention.

FIG. 8 is a schematic cross-sectional view showing a reflective liquid crystal display device according to a second embodiment of the present invention. Detailed explanations for the similar structures to those of FIG. 7 will be omitted for simplicity.

In FIG. 8, first and second substrates 410 and 450 face into each other and a liquid crystal layer 470 is interposed therebetween. A thickness of the liquid crystal layer 470 is defined as a cell gap "d". A thin film transistor (TFT) "T" is formed on the inner surface of the first substrate 410. A first passivation layer 420 having a plurality of first uneven patterns 418 in a sub-pixel region "P" is formed on the TFT "T", and a second passivation layer 422 having a plurality of second uneven patterns 422a is formed on the first passivation layer 420. The second passivation layer 422 is formed of a light-shielding material. The first and second passivation layers 420 and 422 include a drain contact hole 416 exposing the drain electrode 414. A reflective layer 424 connected to the drain electrode 414 through the drain contact hole 416 is formed on the 'second passivation layer 422.

A planarization layer 426 is formed on the reflective layer 424. The planarization layer 426 improves the uniformity of the cell gap "d". Furthermore, when the second passivation layer 422 is formed of a carbonic material such as a black resin, the planarization layer 426 prevents the carbonic material from contaminating the liquid crystal layer 470 under a structure that the second passivation layer 422 contacts the liquid crystal layer 470. When the planarization layer 426 has a refractive index (about 1.5) similar to that of the liquid crystal layer and an alignment layer, the light emitted from the front of the uneven patterns of the reflective layer does not experience a path change. Accordingly, the planarization layer 426 does not affect the reflectance along an effective viewing angle.

Figure 9:
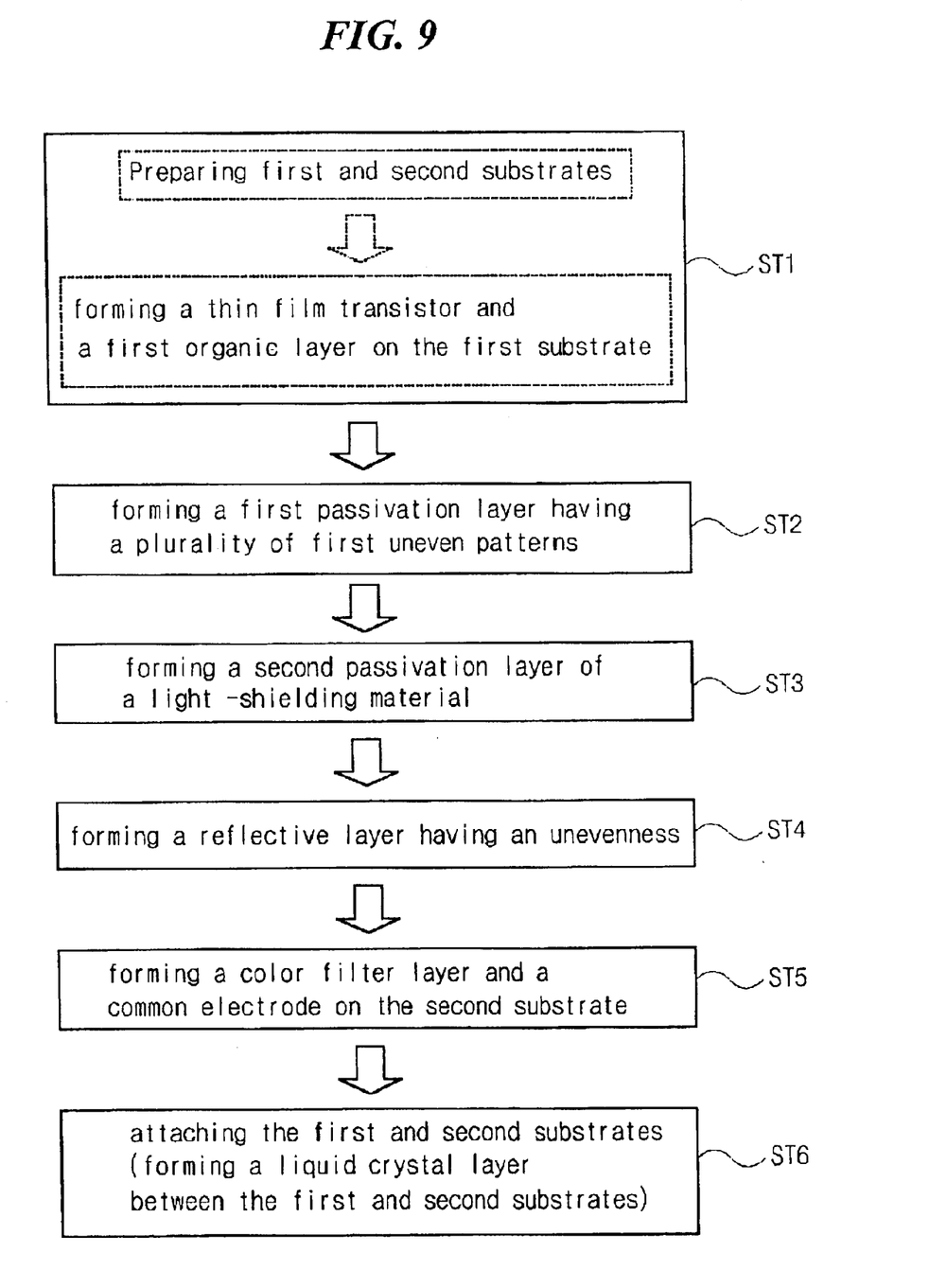
FIG. 9 is a flow chart showing the fabricating method of a reflective liquid crystal display device according to the first embodiment of the present invention.

FIG. 9 is a flow chart showing the fabricating method of a reflective liquid crystal display device according to the first embodiment of the present invention.

In step ST1 of FIG. 9, after first and second substrates are provided, a gate line and a data line crossing each other are formed on the first substrate. A thin film transistor (TFT) including a gate electrode, a semiconductor layer, and source and drain electrodes is connected to the gate line and the data line. A first organic material layer of a first organic material is formed on the TFT. A sub-pixel region is defined by the gate line and the data line. The first organic material is photosensitive. For example, a positive type photosensitive organic material can be used for the first organic material layer. The positive type photosensitive organic material can have a low dielectric constant.

In step ST 2 of FIG. 9, after the first organic material layer is patterned through a photolithographic process, a first passivation layer having a plurality of first uneven patterns in the sub-pixel region is obtained through melting and curing processes of the patterned first organic material layer. The first passivation layer covers the TFT to protect the channel of the semiconductor layer and the data line to prevent a parasitic capacitance between the data line and the subsequent reflective layer.

In step ST 3 of FIG. 9, a second passivation layer is formed on the first passivation layer. Since the second passivation layer has a plurality of second uneven patterns along the plurality of the first uneven patterns, the second passivation layer increases the reproducibility of a slanting angle for the plurality of first uneven patterns, and since the second passivation layer is formed of a light-shielding material, the second passivation layer functions as a black matrix. Accordingly, the second passivation layer may be formed of a second organic material having an optical density greater than 3. For example, a black resin may be used for the second passivation layer. Moreover, the second passivation layer covers the gate line, the data line, and the TFT to prevent the reflection at metal lines. The first and second passivation layers include a drain contact hole exposing the drain electrode.

In step ST 4 of FIG. 9, a reflective layer connected to the drain electrode through the drain contact hole is formed on the second passivation layer. The reflective layer has a plurality of third uneven patterns according to the plurality of the second uneven patterns on its top surface. After forming the reflective layer, a planarization layer may be formed on the reflective layer.

In step ST 5 of FIG. 9, a color filter layer and a common electrode are sequentially formed on the second substrate.

In step ST 6 of FIG. 9, the first and second substrates are attached to each other such that the reflective layer and the common electrode face into each other, and a liquid crystal layer is formed therebetween.

In the reflective LCD device having first and second passivation layers on a gate line, a data line, and a TFT, since the second passivation layer is formed of a light-shielding material, the reflection at metal lines, such as the gate line and the data line, and the irradiation onto the TFT are effectively prevented. Moreover, since the second passivation layer is formed on a substrate having the metal lines, the reduction of a contrast ratio is also prevented. Therefore, the reflective LCD device can obtain a high aperture ratio, a high contrast ratio, and simplification of the fabricating process for the color filter substrate.

It will be apparent to those skilled in the art that various modifications and variations can be made in the liquid crystal display device and the fabricating method thereof of the present invention without departing from the spirit or scope of the inventions. Thus, it is intended that the present invention, covers the modifications and variations of this invention provided they come within the scope of the appended claims and their equivalents.

What is claimed is:

1. A liquid crystal display device, comprising:

first and second substrates spaced apart from each other;

a gate line and a data line over an inner surface of the first substrate, the gate line and the data line crossing each other and defining a sub-pixel region;

a thin film transistor connected to the gate line and the data line;

a first passivation layer on the thin film transistor layer, the first passivation layer directly on the thin film transistor, the data line and a channel region of the thin film transistor, the first passivation layer having a plurality of first uneven patterns in the sub-pixel region;

a second passivation layer acting as a light-shielding layer on the first passivation layer, the second passivation layer having a plurality of second uneven patterns on the first uneven patterns; and a reflective layer on the second passivation layer, the reflective layer having a plurality of third uneven patterns on the second uneven patterns.

2. The device according to claim 1, further comprising, a common electrode on an inner surface of the second substrate; and a liquid crystal layer between the reflective layer and the common electrode.

3. The device according to claim 1, wherein the second passivation layer has an optical density greater than 3.

4. The device according to claim 1, wherein the second passivation layer is formed of a black resin.

5. The device according to claim 1, further comprising a planarization layer on the reflective layer.

6. The device according to claim 2, further comprising a color filter layer between the second electrode and the common electrode.

7. The device according to claim 1, wherein the thin film transistor comprises a gate electrode, a semiconductor layer, and source and drain electrodes.

8. The device according to claim 7, wherein the second passivation layer has a drain contact hole exposing a portion of the drain electrode through the first passivation layer.

9. The device according to claim 7, wherein the reflective layer is connected to the drain electrode through the drain contact hole.

10. The device according to claim 7, further comprising an interlayer insulating layer on the reflective layer and a transparent electrode on the interlayer insulating layer, wherein the reflective layer is electrically floated.

11. The device according to claim 10, wherein the interlayer insulating layer has a drain contact hole exposing a portion of the drain electrode through the first and second passivation layers, and the transparent electrode is connected to the drain electrode through the drain contact hole.

12. A method of fabricating a liquid crystal display device, comprising:

forming a gate line and a data line crossing each other over a first substrate, the gate line and the data line defining a sub-pixel region;

forming a thin film transistor connected to the gate line and the data line;

forming an organic material layer on the thin film transistor layer;

forming a first passivation layer directly on the thin film transistor, the data line and a channel region of the thin film transistor, the first passivation layer having a plurality of first uneven patterns in the sub-pixel region;

forming a second passivation layer acting as a light-shielding layer on the first passivation layer, wherein the second passivation layer has a plurality of second uneven patterns on the first uneven patterns of the first passivation layer;

forming a reflective layer on the second passivation layer, wherein the reflective layer has a plurality of third uneven patterns on the second uneven patterns of the second passivation layer;

forming a common electrode on a second substrate;

attaching the first and second substrates to each other such that the reflective layer faces into the common electrode; and forming a liquid crystal layer between the reflective layer and the common electrode.

13. The method according to claim 12, wherein the second passivation layer has an optical density greater than 3.

14. The method according to claim 13, wherein the second passivatian layer is fanned of a black resin.

15. The device according to claim 5, wherein the planarization layer includes an alignment layer and a refractive index of the planarization layer is similar to a refractive index of the liquid crystal layer.

16. The device according to claim 5, wherein a refractive index of the planarization layer is about 1.5.

17. The device according to claim 12, further comprising forming a planarization layer on the reflective layer.

18. The device according to claim 17, further including forming an alignment layer on the planarization layer, wherein a refractive index of the planarization layer is similar to a refractive index of the liquid crystal layer.

19. The device according to claim 17, wherein a refractive index of the planarization layer is about 1.5.

20. A liquid crystal display device, comprising:

first and second substrates spaced apart from each other;

a gate line and a data line over an inner surface of the first substrate, the gate line and the data line crossing each other and defining a sub-pixel region;

a thin film transistor connected to the gate line and the data line;

a first passivation layer on the thin film transistor layer, the first passivation layer having a plurality of first uneven patterns in the sub-pixel region;

a second passivation layer acting as a light-shielding layer on the first passivation layer, the second passivation layer having a plurality of second uneven patterns on the first uneven patterns; and a reflective layer on the second passivation layer, the reflective layer having a plurality of third uneven patterns on the second uneven patterns and being electrically floated.

* * * * *